United States Patent
Engel et al.

(10) Patent No.: US 9,939,261 B2
(45) Date of Patent: Apr. 10, 2018

(54) METHOD AND DEVICE FOR CALIBRATING AN IMAGING OPTICAL UNIT FOR METROLOGICAL APPLICATIONS

(71) Applicant: Carl Zeiss Industrielle Messtechnik GmbH, Oberkochen (DE)

(72) Inventors: Thomas Engel, Aalen (DE); Nils Haverkamp, Aalen (DE); Dominik Seitz, Schwaebisch Gmuend (DE); Daniel Plohmann, Lauingen (DE)

(73) Assignee: CARL ZEISS INDUSTIELLE MESSTECHNIK GMBH, Oberkochen (DE)

( * ) Notice: Subject to any disclaimer, the term of this patent is extended or adjusted under 35 U.S.C. 154(b) by 0 days.

(21) Appl. No.: 15/343,675

(22) Filed: Nov. 4, 2016

(65) Prior Publication Data

US 2017/0074649 A1    Mar. 16, 2017

Related U.S. Application Data

(63) Continuation of application No. PCT/EP2014/059258, filed on May 6, 2014.

(51) Int. Cl.
*G01B 11/14* (2006.01)
*G01B 21/04* (2006.01)
(Continued)

(52) U.S. Cl.
CPC ............ *G01B 21/042* (2013.01); *G01B 11/02* (2013.01); *G06T 5/006* (2013.01); *G06T 7/80* (2017.01)

(58) Field of Classification Search
CPC ......... G01B 21/042; G01B 11/02; G06T 7/80; G06T 5/006
(Continued)

(56) References Cited

U.S. PATENT DOCUMENTS

2004/0095638 A1* 5/2004 Engel .................. G02B 21/008
359/368
2007/0106482 A1   5/2007 Zandifar et al.
(Continued)

FOREIGN PATENT DOCUMENTS

DE             195 36 297 A1    4/1997
DE        10 2004 020 881 A1   11/2005
(Continued)

OTHER PUBLICATIONS

English language translation of International Preliminary Report on Patentability (Chapter I) for PCT/EP2014/059258; dated Nov. 8, 2016; 12 pp.
(Continued)

*Primary Examiner* — Sunghee Y Gray
(74) *Attorney, Agent, or Firm* — Harness, Dickey & Pierce, P.L.C.

(57) ABSTRACT

A calibration pattern having a plurality of pattern regions for calibrating an imaging optical unit for metrological applications. At least one image of the calibration pattern is recorded using the imaging optical unit. The image is evaluated to quantify individual properties of the imaging optical unit. Depending on the quantified individual properties, correction values for a calculated correction of aberrations of the imaging optical unit are determined. The calibration pattern is provided on an electronic display having a plurality of display pixels arranged in the form of a matrix. In addition, a calibration body with at least one line having a defined dimension, is recorded using the imaging optical unit. A magnification factor of the imaging optical unit is determined on the basis of the at least one line. At least one further individual property of the imaging optical unit is quantified on the basis of the calibration pattern.

18 Claims, 3 Drawing Sheets

(51) Int. Cl.
*G06T 5/00* (2006.01)
*G06T 7/80* (2017.01)
*G01B 11/02* (2006.01)

(58) Field of Classification Search
USPC .......................................................... 356/625
See application file for complete search history.

(56) References Cited

U.S. PATENT DOCUMENTS

| | | | | |
|---|---|---|---|---|
| 2012/0262563 | A1* | 10/2012 | Marcelpoil | ............. G06T 5/006 348/79 |
| 2012/0287287 | A1* | 11/2012 | Grossmann | .......... H04N 17/002 348/181 |
| 2014/0218590 | A1* | 8/2014 | Nunnink | ............ G01M 11/0228 348/345 |

FOREIGN PATENT DOCUMENTS

| | | |
|---|---|---|
| DE | 10 2006 034 350 A1 | 1/2008 |
| DE | 10 2010 000 745 A1 | 7/2010 |
| DE | 10 2013 014 475 A1 | 3/2014 |
| WO | WO 02/39055 A1 | 5/2002 |
| WO | WO2012/154874 A1 | 11/2012 |
| WO | WO 2014/023346 A1 | 2/2014 |

OTHER PUBLICATIONS

International Search Report for PCT/EP2014/059258; dated Jan. 27, 2015; 3 pages.

\* cited by examiner

METHOD AND DEVICE FOR CALIBRATING AN IMAGING OPTICAL UNIT FOR METROLOGICAL APPLICATIONS

CROSS-REFERENCES TO RELATED APPLICATIONS

This application is a continuation of international patent application PCT/EP2014/059258 filed on May 6, 2014 designating the U.S. The entire content of this prior application is incorporated herein by reference.

BACKGROUND OF THE INVENTION

The present invention relates to a method and a device for calibrating an imaging optical unit for metrological applications. In particular, the invention relates to a method and a device making use of an electronic display for calibrating an imaging optics of a measuring machine.

DE 10 2006 034 350 A1 discloses a calibration piece for producing bright-dark transitions with a known distance from one another. The calibration piece is an elongate cuboid bar having a plurality of through-holes, the opening diameters of which at the upper side and the lower side of the calibration piece differ. Some of the through-holes taper from the upper side of the calibration piece toward the lower side. Other through-holes taper from the lower side toward the upper side. Incorrect measurements due to isolated edges and distortion due to a lack of parallelism are supposed to be avoided on the basis of this calibration piece. The known calibration piece in particular serves for calibrating a line scan camera, with the aid of which the edge position of material webs passing below the line scan camera is determined.

DE 10 2004 020 881 A1 discloses a method and a device for geometrically calibrating a measurement image camera, wherein a defined test structure is generated using a coherent, monochromatic light source and a double slit. The double slit is illuminated, for example, by a light source in the form of a laser. The two slits of the double slit each produce a diffraction pattern, which is recorded with the measurement image camera to be calibrated.

DE 195 36 297 A1 describes a method for geometrically calibrating optical 3D sensors, wherein a special calibration body is used, which is configured to have a black and white striped pattern. The pattern is arranged orthogonally with respect to a stripe pattern which the optical 3D sensor requires for the measurement. The calibration body can have further signal markings or reference markings which must be within the camera's field of view.

The known calibration devices and methods each use special calibration bodies having known properties which are specifically matched to the measurement device to be calibrated. The more accurate and extensive the calibration is intended to be, the greater is the complexity for the provision of the required calibration bodies. On the other hand, there is an increasing demand for being able to use imaging optical units for metrological applications in a highly flexible manner and accordingly for calibrating with respect to a plurality of different aberrations. Multifarious measurement tasks arise in this context, which are intended to be optimized in the one or the other direction, depending on the size, type and nature of the workpieces.

DE 10 2010 000 745 A1 describes a calibration pattern for calibrating an image measurement instrument and in particular for calibrating a camera-based measurement device for measuring the length of a measurement object. The calibration pattern consists of concentric or helical square rings which provide bright-dark transitions that alternate in the x and y directions. The respective distances of successive bright-dark transitions and/or dark-bright transitions are known and serve for calibrating the optical measurement device. The respectively appropriate transitions in the calibration pattern can be used for the calibration in dependence on the appearance of the bright-dark transitions on a measurement object to be measured. DE 10 2010 000 745 A1 fails to describe how the proposed calibration patterns are to be implemented in practice. However, the fact that the actual distances between the bright-dark transitions and/or dark-bright transitions are intended to be used for the calibration implies that said distances must be produced with great accuracy and reproducibility, which in turn implies a calibration body that is produced specifically for this calibration.

SUMMARY OF THE INVENTION

Against this background, it is an object of the present invention to provide a method and a device for calibrating an imaging optical unit for metrological applications, which permit flexible, extensive and cost-effective calibration for various measurement tasks.

According to a first aspect of the invention, there is provided a method for calibrating an imaging optical unit for metrological applications, comprising the steps of providing an electronic display having a plurality of display pixels arranged in form of a matrix, said electronic display being configured to produce, with the aid of the display pixels, a plurality of different calibration patterns in a temporally successive manner, providing a calibration body comprising at least one line having a defined dimension, generating at least one calibration pattern on the electronic display, said at least one calibration pattern having a plurality of pattern regions which have a defined relationship with respect to one another, recording at least one image of the at least one calibration pattern and the at least one line using the imaging optical unit, evaluating the at least one image to quantify individual properties of the imaging optical unit, and determining correction values for a calculated correction of aberrations of the imaging optical unit in dependence on the quantified individual properties, wherein a magnification factor of the imaging optical unit is determined on the basis of the at least one line, and wherein at least one further individual property of the imaging optical unit is quantified on the basis of the at least one calibration pattern.

According to a further aspect of the invention, there is provided a calibration device for calibrating an imaging optical unit for metrological applications, said imaging optical unit having individual aberrations, and said calibration device comprising an electronic display having a plurality of display pixels arranged in form of a matrix, comprising a calibration body comprising at least one line having a defined dimension, comprising a pattern generator configured for generating, with the aid of the display pixels, a plurality of different calibration patterns on the electronic display, the calibration patterns each having a plurality of pattern regions with a defined relationship to one another, and comprising a calibration unit configured to evaluate at least one image of at least one of said different calibration patterns recorded through the imaging optical unit, wherein the calibration unit is configured to determine, on the basis of the at least one line, a magnification factor of the imaging optical unit, wherein the calibration unit is further configured to quantify at least one further individual property of the imaging optical unit on the basis of the at least one calibration pattern, and wherein the calibration unit is further configured to determine and to provide correction values for a calculated correction of the individual aberrations in dependence on the at least one quantified individual property.

It is particularly advantageous if the novel calibration device is integrated in a measurement device for measuring a plurality of different measurement objects. Accordingly, there is also provided a measurement device for measuring a plurality of different measurement objects, comprising a workpiece holder for positioning a measurement object, comprising an imaging optical unit configured for generating an image of the measurement object, said imaging optical unit having individual aberrations, comprising an evaluation unit for evaluating the image and for determining individual properties of the measurement object, and comprising a calibration device for calibrating the imaging optical unit, the calibration device comprising an electronic display having a plurality of display pixels arranged in form of a matrix, a calibration body comprising at least one line having a defined dimension, a pattern generator configured for generating, with the aid of the display pixels, a plurality of different calibration patterns on the electronic display, the calibration patterns each having a plurality of pattern regions with a defined relationship to one another, and a calibration unit configured to evaluate at least one image of at least one of said different calibration patterns recorded through the imaging optical unit, wherein the calibration unit is configured to determine, on the basis of the at least one line, a magnification factor of the imaging optical unit, wherein the calibration unit is further configured to quantify at least one further individual property of the imaging optical unit on the basis of the at least one calibration pattern, and wherein the calibration unit is further configured to determine and to provide correction values for a calculated correction of the individual aberrations in dependence on the at least one quantified individual property, wherein the evaluation unit is configured to determine the individual properties of the measurement object on the basis of the correction values.

It is preferred if the pattern generator and the calibration unit are implemented on a personal computer, on a workstation, on a tablet computer, on a smart phone, or on any other digital data processing device using a piece of software to implement the afore-mentioned functionality. Likewise, the evaluation unit may be a personal computer, a workstation, a programmable logic controller, or a tablet computer or on any other digital data processing device using a piece of software. In some preferred embodiments, the evaluation unit may comprise the pattern generator and the calibration unit.

The novel method and device use an electronic display with which a plurality of different calibration patterns can be produced flexibly and variably. In principle, the electronic display may be what is known as a tablet PC or a mobile telephone, in particular a smart phone. In some exemplary embodiments, the calibration body having the line is a transparent plate which is detachably or permanently connected to the electronic display to form an electronic calibration body. By way of example, a commercial tablet PC may be provided with a special holder for holding a transparent plate having the exactly defined line. The display, the holder and/or the transparent plate may in some exemplary embodiments be assembled by the user of the calibration device for performing a specific calibration task. By way of example, a commercial tablet PC could be inserted into a mechanical holder which has receiving points with an accurate fit both for the tablet PC and for the transparent plate. In other exemplary embodiments, the calibration body may be a spherical gauge block having a plurality of spheres, a ring, a partial or whole sphere or another three-dimensional body on which the at least one line is implemented in the form of an edge, a circumference and/or a distance measure between two form elements. Moreover, the housing of the tablet PC or smart phone, more generally of the display, may serve as the calibration body having the defined dimension if the defined dimension is measured instantaneously on site as part of the calibration.

The pattern generator may produce the different calibration patterns, if appropriate, on the basis of an algorithm stored in the pattern generator and/or retrieve predefined calibration patterns from an integrated permanent memory. Producing or retrieving may be time-controlled, effected manually by the user, and/or effected by a trigger signal which is supplied to the pattern generator, for example by the measurement device to be calibrated. The pattern generator may consequently in some exemplary embodiments have an interface having an input for supplying the trigger signal.

In all practical exemplary embodiments, the calibration body with the aid of the line provides an absolute known linear measure. It is advantageous if the linear measure is traceable directly or indirectly to international standards for the unit length. The known dimension permits highly accurate determination of the magnification factor of the imaging optical unit to be calibrated. This is desirable if the imaging optical unit is intended to be used for determining with great accuracy spatial dimensions on measurement objects.

The magnification factor, however, is only one of numerous properties of an imaging optical unit that is significant for metrological applications. Another individual property is, for example, the distortion of the imaging optical unit which becomes visible if the image of a measurement object that is produced with the imaging optical unit is distorted in the form of a pin cushion or a barrel. The distortion represents a spatially dependent local magnification of the imaging optical unit which can be different in particular at the field periphery of the imaging optical unit than in the region of the optical axis. In order to calibrate an imaging optical unit with respect to the individual distortion, large-area calibration patterns are desirable that can be produced very easily and cost-effectively using the electronic display.

However, an electronic display cannot provide an absolute linear measure, or at best only with an extremely large production complexity, since the display pixels of an electronic display are subject to numerous manufacturing tolerances. The novel method and the corresponding device therefore combine in a highly advantageous manner a simple, exact "linear measurement standard", which in advantageous examples provides merely the absolute linear measure, and an electronic display, which is capable of producing different calibration patterns for further calibration tasks. The calibration body with the linear measure may in some advantageous exemplary embodiments be a transparent plate on which the line is permanently provided, for example using lithographic methods as are used in semiconductor technology. Alternatively or additionally, the at least one line may be provided on or in the transparent plate using an electron beam writing method, for example in the form of a thin chrome layer. The calibration body is advantageously made from a material having a low coefficient of thermal expansion, for example of quartz glass, quartz or Zerodur®. Zerodur® is a glass-ceramic material by Schott AG, Germany, which is known to have a very low coefficient of thermal expansion. Alternatively, the absolute linear measure is measured on site as part of the calibration.

In preferred exemplary embodiments, the transparent plate is provided with a broadband anti-reflection coating. The anti-reflection coating advantageously acts over the entire spectral range of visible light. For infrared light, the transparent plate may in turn be configured to be reflective so as to be able to record the calibration patterns through the transparent plate with high contrast, while also being able to detect the at least one line on the transparent plate in optimum fashion.

The calibration patterns which are capable of being produced flexibly on the electronic display are not determined exactly in terms of their individual properties and are correspondingly not exactly known owing to the manufacturing tolerances of the display pixels. However, they are sufficiently consistent to allow calibration of the imaging optical unit to be performed by way of evaluating measurement series which are designed for consistency. By way of example, an individual calibration pattern may be recorded with the imaging optical unit from various distances and/or different lateral positions with the imaging optical unit to be calibrated. Since the calibration pattern as such remains the same on the electronic display, deviations with respect to the obtained measurement results can be traced back to the imaging optical unit and/or the relative displacement of imaging optical unit and calibration pattern. For this reason, the electronic display permits, despite the properties of the calibration patterns as such not being exactly known, exact calibration with respect to aberrations, such as distortion, contrast, chromatic aberration and so on, in a relatively simple and cost-effective manner. Additionally, the novel calibration device uses a separate linear measure for calibrating the magnification factor.

Overall it has been shown that the novel method and the corresponding device permit flexible calibration of an imaging optical unit for metrological applications in a highly cost-effective manner. The above-mentioned object is therefore achieved completely.

In a preferred refinement of the invention, the electronic display has an upper side, on which the calibration pattern is displayed, and the at least one line is arranged above the calibration pattern on the upper side.

This refinement permits highly cost-effective implementation since the linear measure can be affixed simply on or above the electronic display. In the preferred exemplary embodiments, a transparent plate has only few lines, i.e. the lines on the plate cover less than 10% and preferably less than 2% of the transparent surface of the plate. In these exemplary embodiments, the transparent plate reduces the view of the imaging optical unit through to the calibration pattern to a negligible degree at most. In addition, the imaging optical unit's view of the absolute scale in this embodiment is "clear", i.e. the absolute scale is not negatively affected by the display or by calibration patterns produced thereon.

In a further refinement, the transparent plate is a cover plate of the electronic display.

In this refinement, the transparent plate having the at least one line is arranged fixedly on or above the upper side of the electronic display. The transparent plate is an integral part of the display. Handling of the novel calibration device is thus facilitated.

In a further refinement, the at least one line is arranged, in a top view onto the calibration pattern, such that it is offset with respect to the display pixels. The at least one line advantageously has a width which is less than twice the width of a display pixel. In some exemplary embodiments, the width of the at least one line approximately corresponds to the lateral dimensions of a display pixel.

In this refinement, the at least one line is arranged above the display pixels of the electronic display such that the at least one line at least does not completely cover the display pixels which are located below it. In a way, the at least one line extends between the display pixels, although it may be possible, depending on the size of and spacing between the display pixels, for the at least one line to partially cover individual display pixels. The refinement has the advantage that the calibration pattern is available practically entirely for the quantification of the at least one further individual property, even though the absolute scale is arranged above it. The extent to which the absolute scale covers the calibration pattern is reduced to a minimum.

In a further refinement, the display pixels together define a maximum display area, wherein the imaging optical unit has a field of view, and wherein the electronic display is positioned at a distance from the imaging optical unit that is selected such that the field of view constitutes at most ¾ of the maximum display area. The field of view of the imaging optical unit is preferably positioned largely centrally on the electronic display. It is furthermore preferred if the field of view of the imaging optical unit constitutes at most ⅔ of the maximum display area.

In this refinement, the display area of the electronic display is larger than is necessary for the imaging optical unit to be calibrated. It is thus possible to produce calibration patterns which have such a large area that the imaging optical unit can image in each case only sections of the calibration patterns. At first glance, this refinement appears to be disadvantageous, since displays are used that are larger and thus more expensive than necessary for the calibration of the imaging optical unit. However, it has been shown that the calibration patterns can be produced with a greater homogeneity if not the entire display area is utilized. For this reason, this refinement permits calibration with a great degree of accuracy in a simple and, ultimately, cost-effective way.

In a further refinement, the at least one image is recorded with an electronic image recorder having a plurality of sensor pixels, wherein the number of display pixels is greater than the number of sensor pixels. The ratio between the number of display pixels and the number of sensor pixels is preferably approximately within the range of the assumed magnification factor (predetermined factor for the magnification) of the imaging optical unit to be calibrated. In the preferred exemplary embodiments, the number of display pixels is greater than the number of sensor pixels at least by the magnification factor of the imaging optical unit, and in particular, the number of the display pixels is greater than the number of the sensor pixels at least by a factor of 10.

A high pixel density in the pattern-producing display facilitates the quantification of the contrast profile at bright-dark edges or the "washing out" caused by the imaging optical unit. Determination of the location of an edge is of great significance in modern image processing. The greater the accuracy with which the position of an edge can be determined, the greater the accuracy with which a measurement object can be measured. Accordingly, it is advantageous if the novel calibration device can be used to produce edge profiles which appear to be "continuous" for the electronic image recorder, even though they are produced with the aid of discrete display pixels. This criterion is met in a simple manner in the present refinement. It is particularly advantageous if the edges of the at least one line on the transparent plate are configured with such sharpness that it is possible to calibrate the threshold values for the edge detection on the basis of the line edge. The preferred method thus uses the edges of the at least one line for the calibration of the threshold values for edge detection. The refinement is advantageous because it makes possible, in a cost-effective manner, a highly extensive calibration of an imaging optical unit for metrological applications.

In a further refinement, the imaging optical unit has an optical axis and a field periphery, wherein the at least one line is positioned between the optical axis and the field periphery. In some exemplary embodiments, the at least one line forms a circular ring, which is positioned approximately centrally between the optical axis of the imaging optical unit and the field periphery thereof.

Alternatively, the at least one line could, in different refinements, be positioned on or within the region of the optical axis or entirely at the field periphery of the imaging optical unit. The preferred refinement, by contrast, has the advantage that the distortion, which is quantifiable with the aid of the at least one calibration pattern, is centered to a medium magnification factor, as a result of which the relative distribution of the spatially dependent magnification is minimized. The refinement therefore permits calibration with a greater accuracy while keeping the calibration complexity the same. Configuring the at least one line in the form of a circular ring moreover permits simple, direction-dependent determination and correction of scale errors of the imaging optical unit.

In a further refinement, a size-reducing projective optical unit is arranged at the image-side end of the imaging optical unit.

This refinement is advantageous since the calibration pattern which is produced with the aid of the display pixels is reduced in terms of size on the electronic image recorder, with the result that the "pixeliness" of the electronic display is effectively reduced and contrast profiles appear smoother. The refinement therefore provides in a simple way optimized calibration patterns for flexible and highly accurate calibration of the imaging optical unit with respect to washing out of contrasts and threshold values for the edge detection.

In a further refinement, the individual display pixels each have an emission characteristic, and arranged between the at least one calibration pattern and the imaging optical unit is an plate-shaped intermediate element that modifies the emission characteristic of the individual display pixels. It is particularly advantageous if the plate-shaped intermediate element reduces the emission characteristic of the individual display pixels, i.e. the light emitted by the display pixels is concentrated to a narrower solid angle than without the plate-shaped intermediate element. In some exemplary embodiments, the plate-shaped intermediate element is a filter screen or film, as is used in notebooks and tablet PCs to impede unauthorized reading from the side (what are known as viewing-angle limiting films, Vikuiti filters). In other exemplary embodiments, the plate-shaped intermediate element may have a plurality of micro-lenses and/or be a perforated grid panel, wherein even in these instances the plate-shaped intermediate element is advantageously configured such that it concentrates the emission characteristic of the individual display pixels in a direction perpendicular to the surface of the display.

The refinement has the advantage that a greater luminous efficiency in the direction of the imaging optical unit to be calibrated is achieved. As a result, it is possible to produce calibration patterns with very finely graduated contrast profiles, which is advantageous for a flexible and accurate calibration.

In a further refinement, at least two images of the at least one calibration pattern are recorded in temporal succession by way of the imaging optical unit, wherein the at least one calibration pattern is displaced and/or distorted on the electronic display between the recordings of the at least two images.

In this refinement, the position of the calibration pattern on the electronic display is changed "electronically" by displacing the calibration pattern produced on the display by way of suitable driving of the individual display pixels. The position of the display relative to the imaging optical unit, on the other hand, remains constant. Since the calibration pattern itself stays consistent, this refinement permits in a very advantageous manner the determination of the intrinsic distortion of the electronic display on the basis of the recorded images. The displacement of all image elements of the calibration pattern is advantageously performed in substeps of the graduation error of the display. Alternatively or additionally, the distortion of the contrast pattern on the display can be increased in a determined fashion "electronically" by changing the calibration pattern with the aid of a mathematically known function. With a suitable equalization calculation between the known distortion and the observed distortion in the recorded images, it is possible to advantageously separate the aberrations of the optical unit that result in distortion and the errors of the display.

Moreover, this refinement has the advantage that spatially dependent aberrations of the imaging optical unit can be quantified in a very simple and cost-effective manner on the basis of the consistent calibration pattern.

In a further refinement, the imaging optical unit is part of a measurement device having a defined measurement volume, and the electronic display is permanently arranged in the defined measurement volume.

In this refinement, the electronic display is an integrated part of the measurement device whose imaging optical unit is intended to be calibrated using the electronic display. The refinement has the advantage that the calibration during operation of the measurement device can be repeated any time in a simple and practical manner. It is particularly advantageous if an individual calibration is carried out before each new measurement operation.

In a further refinement, the at least one calibration pattern is produced on the electronic display in dependence on a measurement object to be measured.

In this refinement, the calibration pattern used is dependent on the measurement object to be measured. For two different measurement objects, accordingly, two different calibration patterns are produced on the display. The refinement advantageously utilizes the flexibility offered by the novel method and the novel calibration device. For example, if a relatively small measurement object is measured, it may be advantageous to calibrate the imaging optical unit with a calibration pattern that is optimized to the region around the optical axis of the imaging optical unit. Greater aberrations at the field periphery of the imaging optical unit are then advantageously accepted, since they are of minor importance for the measurement task. In contrast, if a relatively large measurement object is measured whose image completely fills the imaging optical unit's field of view, it is advantageous to optimize the calibration over the entire field of view, even if this results in greater measurement uncertainties in the region of the optical axis. The present refinement advantageously utilizes the capabilities of the novel method and of the novel calibration device by using a dynamic calibration which is matched to the respective measurement situation.

It goes without saying that the features mentioned above and those yet to be explained below can be used not only in the combination respectively indicated, but also in other combinations or by themselves, without departing from the scope of the present invention.

BRIEF DESCRIPTION OF THE DRAWINGS

Exemplary embodiments of the invention are illustrated in the drawing and are explained in greater detail in the following description. In the figures.

DESCRIPTION OF PREFERRED EMBODIMENTS

Figure 1:
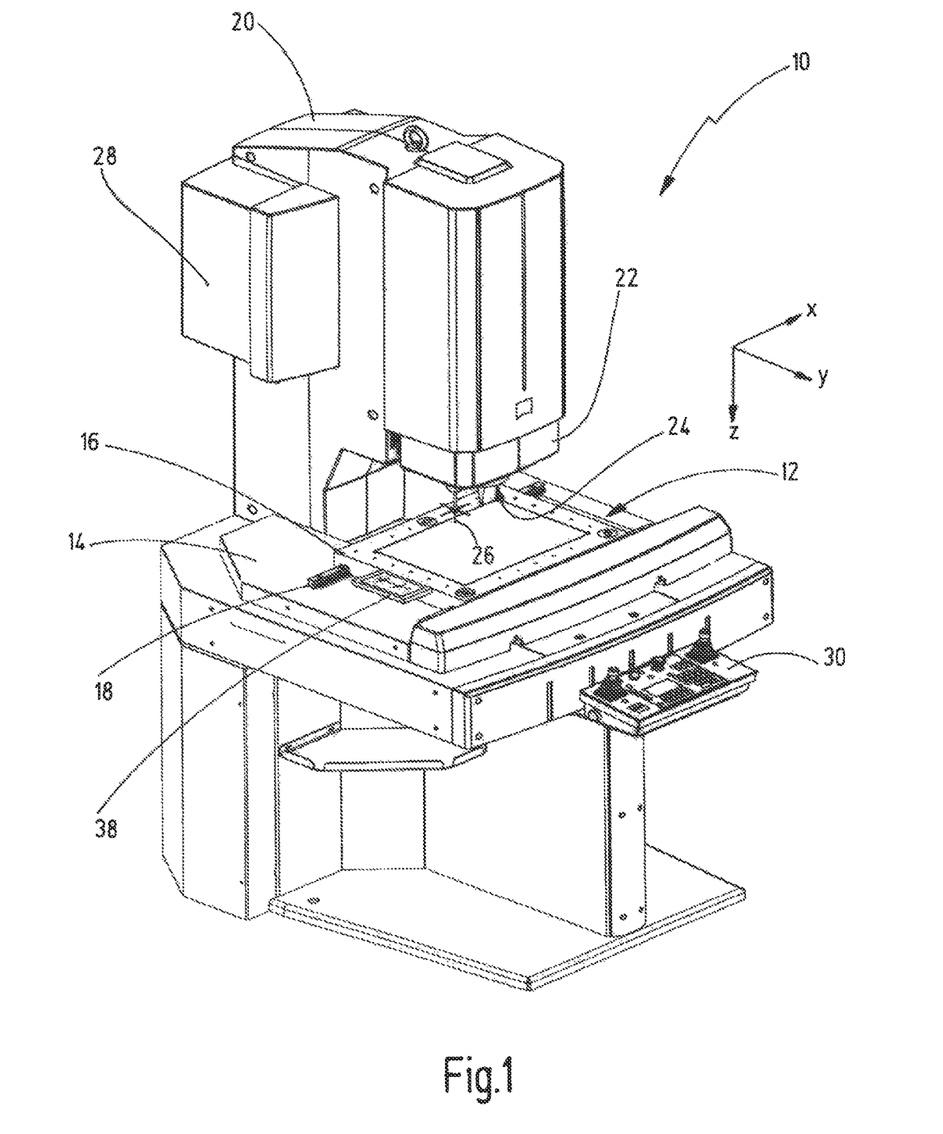
FIG. 1 shows a coordinate measuring machine with an integrated calibration device according to a preferred exemplary embodiment of the invention.

In FIG. 1, a coordinate measuring machine having a preferred exemplary embodiment of the novel calibration device as a whole is designated by reference numeral 10. The coordinate measuring machine 10 has a workpiece holder 12, which in the present case is configured in the form of a cross table. The cross table has a lower part 14, which is movably mounted on guide rails (not shown here). The lower part 14 can move on the guide rails along an axis that is designated the y-axis here. Arranged on the lower part 14 is an upper part 16, which is movably mounted on guide rails 18 along a second axis. The second movement axis is designated here the x-axis. The x-axis and y-axis are arranged orthogonally with respect to one another such that the workpiece holder 12 can move in two mutually orthogonal spatial directions in order to position a workpiece (not illustrated here) within a defined measurement volume.

The coordinate measuring machine 10 furthermore has a column 20, on which a quill 22 is mounted so as to be movable in the vertical direction. The vertical movement direction of the quill 22 is designated here the z-axis. Arranged at the quill 22 is an imaging optical unit 24, which is part of an optical sensor which can be used to measure workpieces. The optical sensor typically contains a camera, which records an image of the measurement object through the imaging optical unit 24. This image is evaluated using methods of image processing. Moreover, the positions of the workpiece holder 12 along the x-axis and y-axis and the position of the quill 22 along the Z-axis are typically evaluated so as to spatially correlate features of the measurement object that are determined with the aid of the image processing.

The coordinate measuring machine 10 has, in this exemplary embodiment, furthermore a tactile sensor, on which a stylus 26 is arranged. The coordinate measuring machine 10 can use the stylus 26 to probe selected measurement points on a measurement object in order to determine in this way spatial coordinates of the probed measurement points within the measurement volume that is defined by the movement axes.

The reference numeral 28 designates an evaluation and control unit, which controls the movements of the workpiece holder 12 and the quill 22. The evaluation and control unit furthermore evaluates the signals provided by the sensors and determines the desired properties of the measurement object in dependence on a user-defined measurement program. The reference numeral 30 designates a control panel via which an operator can effect inputs into the evaluation and control unit.

The coordinate measuring machine 10 illustrated here is an example of a measurement device in which the novel method and the novel calibration device can be advantageously used. The novel method and the novel calibration device are not, however, limited to the coordinate measuring machine 10. They can likewise be used in different measurement devices which have a construction that differs from the illustration in FIG. 1. Moreover, the novel method and the novel calibration device can advantageously be used in measurement devices which determine surface properties of a measurement object, such as roughness, gloss level or the like. In other words, the novel method and the novel calibration device are not limited to measurement devices that determine geometric properties of a measurement object.

According to one preferred exemplary embodiment, the coordinate measuring machine 10 includes an integrated calibration device 32 here (see FIG. 2), which includes an electronic display 38. In the preferred exemplary embodiment, the electronic display 38 is permanently arranged in the measurement volume of the coordinate measuring machine 10 such that a calibration of the imaging optical unit 24 can be carried out at any time even during a measurement or between temporally successive measurements. In different exemplary embodiments, the display 38 can be attached to a workpiece pallet, as are used for automated delivery of workpieces to the measurement device. In this case it is advantageous if the workpiece pallet has electrical contacts via which the display 38 can communicate with the evaluation and control unit 28 of the measurement device.

Figure 2:
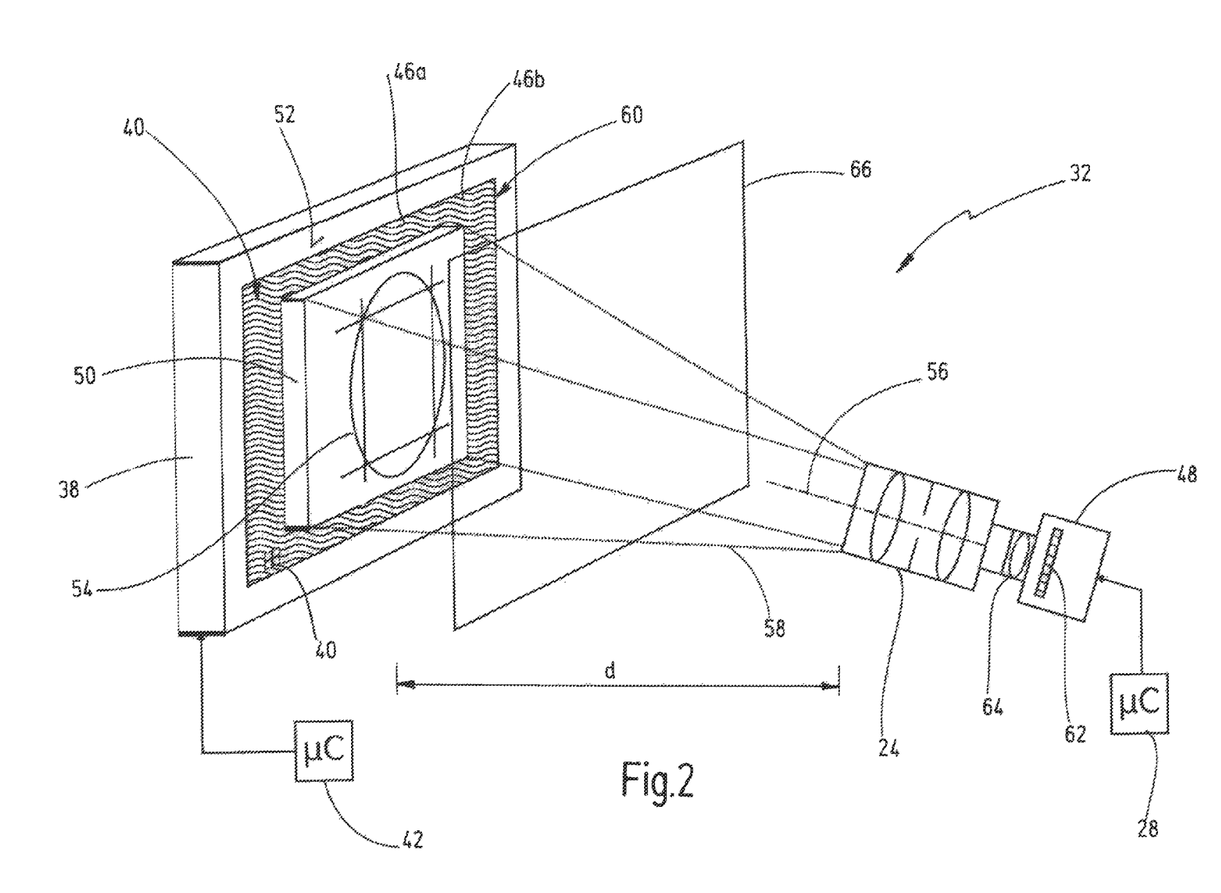
FIG. 2 shows a schematic illustration for explaining preferred exemplary embodiments of the novel method and of the novel calibration device.

In the illustrated exemplary embodiment, the electronic display 38 is attached to the upper part 16 of the workpiece holder 12, and the upper part 16 can be displaced along its movement axis until the imaging optical unit 24 is positioned perpendicularly above the electronic display 38. Next, a calibration pattern provided by the electronic display 38 can be recorded by the imaging optical unit 24 to be calibrated and evaluated to determine individual properties of the imaging optical unit 24 and to calculate, on the basis thereof, correction values with which aberrations of the imaging optical unit 24 can be corrected by calculation.

FIG. 2 shows the novel calibration device with further details. The display 38 has a plurality of pixels 40. Using the display pixels 40, a pattern generator 42 produces a calibration pattern 44 that has a plurality of pattern regions 46a, 46b. The pattern regions 46a, 46b in the exemplary embodiment illustrated here are wavy lines which have a defined relationship with respect to one another. In principle, the calibration pattern 44 can have different pattern regions 46, such as concentric circular rings, square rings, stripes, grid structures or combinations of such pattern elements. In the preferred exemplary embodiments of the novel method, it is not important for the defined relationships between the individual pattern regions to be known exactly. Instead, it suffices for the relationships between the pattern regions to remain consistent over a time period that is necessary for the calibration. In order to calibrate the imaging optical unit 24, one or more calibration patterns 44 are recorded with a camera 48 through the imaging optical unit 24 and evaluated in terms of consistency between the pattern regions.

In some preferred exemplary embodiments, the distance d between the imaging optical unit 24 (specifically between the front-side glass surface of the imaging optical unit 24) and the calibration pattern 44 on the display 38 is changed from one image recording to the other, such that the calibration pattern 44 is recorded from different distances. Since the pattern regions 46a, 46b remain consistent across the different images in the measurement series, changes between the pattern regions across the individual images in the measurement series can be traced to individual properties of the imaging optical unit 24 and/or the movement axes of the coordinate measuring machine 10. Accordingly, individual properties of the imaging optical unit 24 are determined in the preferred exemplary embodiments from a plurality of images of one or more calibration patterns 44 which are recorded as part of a measurement series with different distances and/or viewing angles.

In some exemplary embodiments, the display 38 is a commercial tablet PC, and the pattern generator 42 is an integrated microprocessor of the tablet PC. In these exemplary embodiments, the calibration patterns 44 are supplied to the pattern generator 42 via a suitable interface (for example a USB interface) from the outside, in particular from the evaluation and control unit 28 of the coordinate measuring machine 10. Said evaluation and control unit is illustrated in FIG. 2 merely schematically by the reference numeral 28.

In different exemplary embodiments, the pattern generator 42 can be a processor of the display 38 on which a specific program for producing calibration patterns is executed. For example, the program can be an app that is provided by the manufacturer of the coordinate measuring machine 10 (in more general terms: the manufacturer of the measurement device) for calibrating their machine.

The evaluation of mutually consistent pattern regions of a calibration pattern across a measurement series permits quantification of different individual properties of the imaging optical unit 24, such as in particular distortion, contrast or contrast washout, color transition etc. However, in order to calibrate the individual magnification factor, it is desirable to provide an absolute scale that is known exactly. With commercial displays, this can be implemented only in association with significant outlay, since in this case the individual properties of the display 38 are highly important and said individual properties are generally unknown.

For this reason, the novel calibration device 32 in this exemplary embodiment has, in addition to the display 38, a transparent plate 50 which is attached here to the upper side 52 of the display 38. In some exemplary embodiments, the transparent plate can be attached to the upper side 52 of the display 38 by way of adhesive bonding or optical contact bonding. The transparent plate 50 is preferably attached to the upper side of the display 38 only in points, such that the display 38 and the transparent plate 50 can move relative to one another. In preferred exemplary embodiments, the plate 50 is produced from quartz glass, quartz, Zerodur® by Schott AG, or another transparent material having a low thermal expansion. By contrast, the display 38 can consist of one or more materials which have a thermal expansion that is significantly higher as compared to the plate 50.

In other exemplary embodiments (not illustrated here), the display 38 can have a mechanical holder or be itself arranged in a mechanical holder, wherein the holder has additional holding elements for the transparent plate that provide an accurate fit. In all these instances, the transparent plate 50 is arranged above the calibration pattern 44 in a top view onto the calibration pattern 44, wherein the calibration pattern 44 remains visible through the plate 50 (which, for reasons of clarity, is not illustrated here).

At least one line with an exactly known dimension is permanently arranged on the transparent plate 50. In the illustrated preferred exemplary embodiment, the plate 50 has, on its upper side, a plurality of lines 54, which in the present case form a circular ring having an exactly known diameter and also a square having exactly known longitudinal sides. In preferred exemplary embodiments, the lines 54 are arranged on the plate 50 using an electron beam writing method and/or lithography methods, as are known from semiconductor manufacturing.

The lines 54 form an exactly known absolute scale which is used in the preferred calibration method to quantify the magnification factor of the imaging optical unit 24. It is furthermore possible in the preferred exemplary embodiments for a bright-dark threshold value to be calibrated for edge detection by evaluating the bright-dark transition, produced by way of the imaging optical unit 24 in the recorded images, at the edges of the lines 54.

In the exemplary embodiment that is illustrated here, the lines 54 produce an absolute scale without graduation. This is possible because the distortion of the imaging optical unit 24 can be quantified on the basis of the calibration patterns 44 on the display 38. A single absolute linear measure thus suffices for the quantification of the magnification factor. In addition, the omission of a graduation has the advantage that the view onto the calibration pattern 44 is obstructed only minimally. In deviation from the present illustration, the plate 50 can, however, have a plurality of absolute linear measures of different lengths so as to be able to optimally calibrate in this way different magnification factors of an imaging optical unit 24 with a zoom function.

In further exemplary embodiments, the absolute linear measure can be a housing edge of the display or another defined dimension on a separate calibration body. In some exemplary embodiments, the absolute linear measure can be determined as part of the calibration by using the previously calibrated positioning axes of the coordinate measuring machine 10 to determine the absolute linear measure. In the coordinate measuring machine 10, the stylus 26 can advantageously be used to this end.

As is illustrated schematically in FIG. 2, the imaging optical unit 24 has an optical axis 56 which, in preferred exemplary embodiments of the novel method, is aligned largely orthogonally with the display 38 and the plate 50. The imaging optical unit 24 also has a field of view which is indicated in FIG. 2 by the reference numeral 58. In the preferred exemplary embodiments, the display 38 with the plate 50 is positioned at a distance d with respect to the imaging optical unit 24 that is selected such that the imaging optical unit 24 merely records a section of the display 38 and not the entire display 38. In the illustration in FIG. 2, the section that is recorded by way of the imaging optical unit 24 approximately corresponds to the lateral extent of the plate 50. In other exemplary embodiments, the plate 50 can, however, just like the display 38, extend beyond the field of view 58 of the imaging optical unit 24 or be smaller than it. In the preferred exemplary embodiments, the field of view of the imaging optical unit 24 is positioned approximately centrally on the display 38, and the distance d is selected such that the field of view 58 constitutes at most ¾ and preferably at most ⅔ of the maximum display area 60 that is defined by the totality of all display pixels 40.

As is indicated in FIG. 2, the calibration pattern 44 and the lines 54 are recorded in preferred exemplary embodiments of the method using a camera 48 having an image recorder which has a plurality of sensor pixels 62. In the preferred exemplary embodiments, the image recorder is the camera that, together with the imaging optical unit 24 and, if appropriate, further elements, makes up the optical sensor of the coordinate measuring machine 10. However, it is conceivable in principle for an imaging optical unit 24 to be coupled to a specific calibration camera in order to perform the calibration.

In the preferred exemplary embodiments, the number of the display pixels 40 of the display 38 is several times greater than the number of the sensor pixels 62 of the image recorder used for the calibration. The number of the display pixels 40 is preferably greater than the number of sensor pixels 62 by a factor of 10, but at least by the assumed magnification factor of the imaging optical unit 24.

Alternatively or additionally, a size-reducing projective optical unit 64 can be used in further exemplary embodiments. In this exemplary embodiment, the projective optical unit 64 is arranged at the image-side end of the imaging optical unit 24. The projective optical unit 64 reduces the size of the real image produced by the imaging optical unit 24 and projects it onto the image recorder. Consequently, the display pixels 40 of the display 38 appear to be reduced in the recorded image, and contrast profiles at bright-dark edges appear to be smoother.

Furthermore, in preferred exemplary embodiments, an intermediate element which modifies the emission characteristic of the display pixels 40 can be arranged between the display 38 and the imaging optical unit 24. In some exemplary embodiments, the intermediate element 66 is what is known as a privacy filter, as is offered for example under the sales description Vikuiti filter for notebooks or the like. In other exemplary embodiments, the intermediate element 66 can have a plurality of micro-lenses (not illustrated here), a micro-lens being arranged in each case above a display pixel 40. The intermediate element 66 can furthermore include a perforated grid plate, wherein in each case one through-hole (not illustrated here) of the perforated grid plate is arranged above a display pixel 40.

In the preferred exemplary embodiments, the intermediate element 66 focuses the light emitted by the display pixels 40 in the direction of the imaging optical unit 24 so as to achieve high image contrast in this way.

Figure 3:
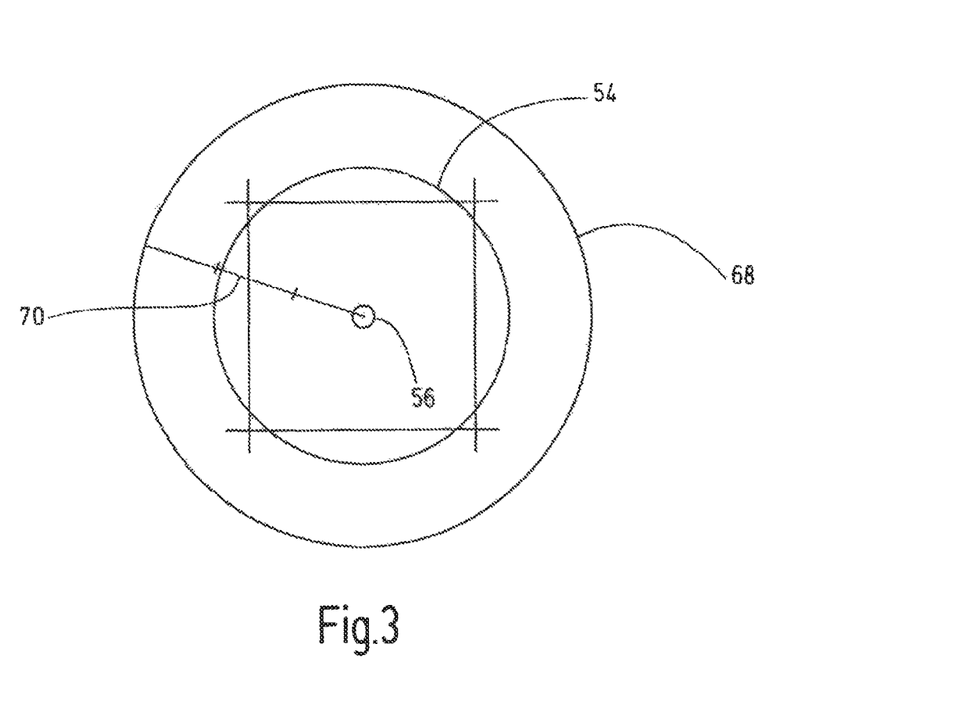
FIG. 3 shows a simplified illustration of an image, which is recorded by way of the imaging optical unit to be calibrated, with a line structure which forms an absolute scale.

FIG. 3 shows, in a simplified illustration, an image of the line 54 on the transparent plate 50, as is produced by the imaging optical unit 24 to be calibrated. The optical axis of the imaging optical unit 24 is illustrated symbolically by the reference numeral 56. The outer circle 68 represents the field periphery, i.e. the outer boundary of the field of view 58. As can be seen in FIG. 3, the line 54 which forms the absolute scale for the calibration of the magnification factor of the imaging optical unit 24 in this exemplary embodiment is arranged approximately centrally between the optical axis 56 and the field periphery 68. It is generally preferred if the at least one line 54 is located in the central third between the optical axis 56 and the field periphery 68. In other words, if the radius from the optical axis 56 to the field periphery 68 is divided into three equal sections, as is indicated by the reference sign 70, the at least one line 54 will, in the preferred exemplary embodiments, be arranged in the central section. In this way, the spatially dependent magnification or distortion is centered around an average magnification factor, and the spatially dependent magnification is distributed to a lesser extent.

Figure 4:
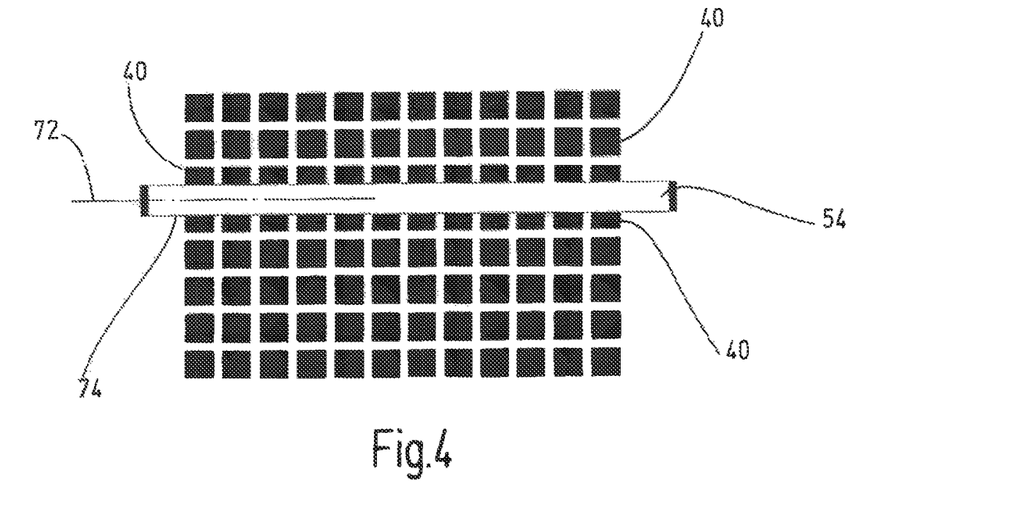
FIG. 4 shows a schematic illustration depicting a preferred position of the at least one line over the display pixels of an electronic display.

Furthermore, in the preferred exemplary embodiments, the at least one line 54 is arranged such that its center of gravity or its axis of symmetry 72 is located between the display pixels 40, as is illustrated in simplified fashion in FIG. 4. In other words, the positioning of the at least one line 54 in the preferred exemplary embodiments is selected such that as few display pixels 40 as possible, and in the optimum case no display pixels 40, are covered entirely by the at least one line 54.

The edges 74 of the at least one line 54 on the plate 50 have a bright-dark transition that is as abrupt as technologically possible. The at least one line 54 in the preferred exemplary embodiments therefore not only permits calibration of the magnification factor of the imaging optical unit 24, but also the ascertainment of optimum threshold values for edge detection and determination of the edge position.

Preferred calibration patterns that are produced with the display 38 have contiguous curved and/or wavy lines. Owing to the discrete display pixels 40, these are "like steps or stairs". However, owing to the number of display pixels 40 being high as compared to the number of sensor pixels 62 and/or owing to the use of the size-reducing projective optical unit 64, the lines of the preferred calibration patterns appear to be sufficiently continuous for the novel calibration to be performed.

What is claimed is:

1. A method for calibrating an imaging optical unit for metrological applications, comprising the steps of:
   providing an electronic display having a plurality of display pixels arranged in the form of a matrix, said electronic display being configured to produce, with the aid of the display pixels, a plurality of different calibration patterns,
   providing a calibration body comprising at least one line having a defined dimension,
   generating at least one calibration pattern on the electronic display, said at least one calibration pattern having a plurality of pattern regions which have a defined relationship with respect to one another,
   recording at least one image of the at least one calibration pattern and the at least one line using the imaging optical unit,
   evaluating the at least one image to quantify individual properties of the imaging optical unit, and
   determining correction values for a calculated correction of aberrations of the imaging optical unit in dependence on the quantified individual properties,
   wherein a magnification factor of the imaging optical unit is determined on the basis of the at least one line,
   wherein at least one further individual property of the imaging optical unit is quantified on the basis of the at least one calibration pattern, and
   wherein the calibration body is a transparent plate on which the at least one line is permanently arranged.

2. The method of claim 1, wherein the transparent plate is a cover plate of the electronic display.

3. The method of claim 1, wherein the electronic display has an upper side on which the calibration pattern is displayed, and wherein the at least one line is arranged on the upper side above the calibration pattern.

4. The method of claim 1, wherein the at least one line is arranged, in a top view onto the calibration pattern, such that it is offset with respect to the display pixels.

5. The method of claim 1, wherein the plurality of display pixels together define a maximum display area, wherein the imaging optical unit has a field of view, and wherein the electronic display is positioned at a distance from the imaging optical unit that is selected such that the field of view covers at most ¾ of the maximum display area.

6. The method of claim 1, wherein the at least one image is recorded using an electronic image sensor having a plurality of sensor pixels, wherein the number of display pixels is greater than the number of sensor pixels.

7. The method of claim 1, wherein the imaging optical unit has an optical axis and a field periphery, and wherein the calibration body is positioned such that the at least one line is between the optical axis and the field periphery.

8. The method of claim 1, wherein a size-reducing projective optical unit is arranged at an image-side end of the imaging optical unit.

9. The method of claim 1, wherein the individual display pixels each have an emission characteristic, and wherein a plate-shaped intermediate element is arranged between said at least one calibration pattern and the imaging optical unit, the plate-shaped intermediate element modifying the emission characteristic of the individual display pixels.

10. The method of claim 1, wherein at least two images of said one calibration pattern are recorded in temporal succession using the imaging optical unit, and wherein said one calibration pattern is shifted on the electronic display between the recordings of the at least two images.

11. The method of claim 1, wherein at least two images of said one calibration pattern are recorded in temporal succession using the imaging optical unit, and wherein said one calibration pattern is distorted on the electronic display between the recordings of the at least two images.

12. The method of claim 1, wherein the imaging optical unit is part of a measurement device having a defined measurement volume, and wherein the electronic display is permanently arranged within the defined measurement volume.

13. The method of claim 1, wherein the imaging optical unit is part of a measurement device for measuring a plurality of different measurement objects, wherein said one calibration pattern on the electronic display is generated in dependence on a specific measurement object to be measured.

14. The method of claim 1, wherein the plurality of different calibration patterns are produced by said electronic display in a temporally successive manner.

15. A calibration device for calibrating an imaging optical unit for metrological applications, said imaging optical unit having individual aberrations, and said calibration device comprising:
an electronic display having a plurality of display pixels arranged in the form of a matrix,
a calibration body comprising a transparent plate on which at least one line having a defined dimension is permanently arranged,
a pattern generator configured for generating, with the aid of the display pixels, a plurality of different calibration patterns on the electronic display, the calibration patterns each having a plurality of pattern regions with a defined relationship to one another, and
a calibration unit configured to evaluate at least one image of at least one of said different calibration patterns recorded through the imaging optical unit,
wherein the calibration unit is configured to determine, on the basis of the at least one line, a magnification factor of the imaging optical unit,
wherein the calibration unit is further configured to quantify at least one further individual property of the imaging optical unit on the basis of the at least one calibration pattern, and
wherein the calibration unit is further configured to determine and to provide correction values for a calculated correction of the individual aberrations in dependence on the at least one quantified individual property.

16. The calibration device of claim 15, wherein the plurality of different calibration patterns are generated on the electronic display in a temporally successive manner.

17. A method for calibrating an imaging optical unit for metrological applications, comprising the steps of:
providing an electronic display having a plurality of display pixels arranged in the form of a matrix, said electronic display being configured to produce, with the aid of the display pixels, a plurality of different calibration patterns,
providing a calibration body comprising at least one line having a defined dimension,
generating at least one calibration pattern on the electronic display, said at least one calibration pattern having a plurality of pattern regions which have a defined relationship with respect to one another,
recording at least one image of the at least one calibration pattern and the at least one line using the imaging optical unit,
evaluating the at least one image to quantify individual properties of the imaging optical unit, and
determining correction values for a calculated correction of aberrations of the imaging optical unit in dependence on the quantified individual properties,
wherein a magnification factor of the imaging optical unit is determined on the basis of the at least one line,
wherein at least one further individual property of the imaging optical unit is quantified on the basis of the at least one calibration pattern, and
wherein the individual display pixels each have an emission characteristic, and wherein a plate-shaped intermediate element is arranged between said at least one calibration pattern and the imaging optical unit, the plate-shaped intermediate element modifying the emission characteristic of the individual display pixels.

18. A method for calibrating an imaging optical unit for metrological applications, comprising the steps of:
providing an electronic display having a plurality of display pixels arranged in the form of a matrix, said electronic display being configured to produce, with the aid of the display pixels, a plurality of different calibration patterns,
providing a calibration body comprising at least one line having a defined dimension,
generating at least one calibration pattern on the electronic display, said at least one calibration pattern having a plurality of pattern regions which have a defined relationship with respect to one another,
recording at least one image of the at least one calibration pattern and the at least one line using the imaging optical unit,
evaluating the at least one image to quantify individual properties of the imaging optical unit, and
determining correction values for a calculated correction of aberrations of the imaging optical unit in dependence on the quantified individual properties,
wherein a magnification factor of the imaging optical unit is determined on the basis of the at least one line, wherein at least one further individual property of the imaging optical unit is quantified on the basis of the at least one calibration pattern, and wherein the imaging optical unit is part of a measurement device for measuring a plurality of different measurement objects, wherein said one calibration pattern on the electronic display is generated in dependence on a specific measurement object to be measured.

* * * * *

UNITED STATES PATENT AND TRADEMARK OFFICE
CERTIFICATE OF CORRECTION

PATENT NO. : 9,939,261 B2
APPLICATION NO. : 15/343675
DATED : April 10, 2018
INVENTOR(S) : Engel et al.

Page 1 of 1

It is certified that error appears in the above-identified patent and that said Letters Patent is hereby corrected as shown below:

On the Title Page

Item (73) Assignee should read:
--CARL ZEISS INDUSTRIELLE MESSTECHNIK GMBH--

Signed and Sealed this
Ninth Day of July, 2019

Andrei Iancu
*Director of the United States Patent and Trademark Office*